H. B. Hynett.
Wheel Cultivator.
Nº 63,260. Patented Mar. 26, 1867.
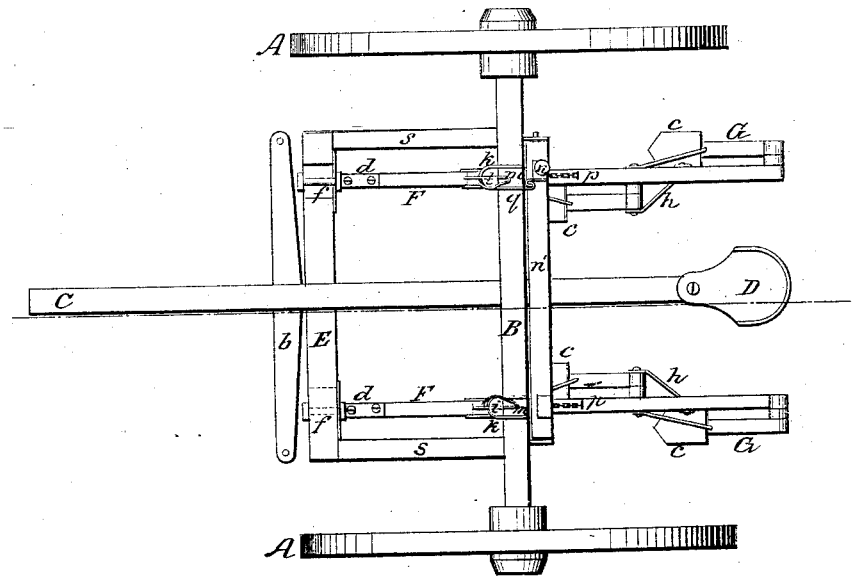
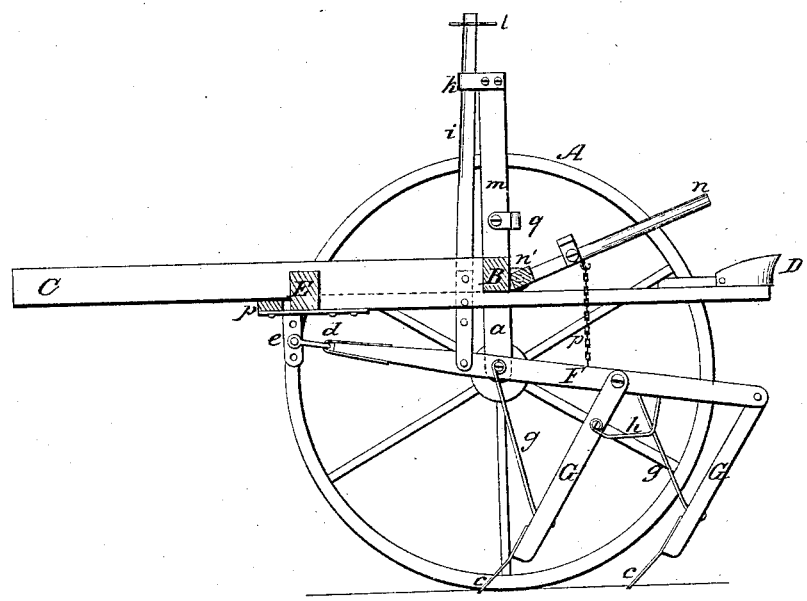
Witnesses.
Theo Trusch.
J. A. Service.
Inventor.
H. B. Hynett.
Per Munn & Co.
Attys

United States Patent Office.

H. P. KYNETT, OF LISBON, IOWA.

Letters Patent No. 63,260, dated March 26, 1867.

---

IMPROVEMENT IN GANG PLOUGHS.

---

The Schedule referred to in these Letters Patent and making part of the same.

---

TO ALL WHOM IT MAY CONCERN:

Be it known that I, H. P KYNETT, of Lisbon, in the county of Linn, and State of Iowa, have invented a new and improved Corn Cultivator; and I do hereby declare that the following is a full, clear, and exact description thereof, which will enable others skilled in the art to make and use the same, reference being had to the accompanying drawings, forming part of this specification, in which—

Figure 1 is a plan view of the corn cultivator.

Figure 2 is a vertical section, taken through the line $x\, x$, fig. 1.

Similar letters of reference indicate like parts.

This invention relates to an improved construction of a cultivator of Indian corn, to work with a double team on both sides of a row of corn at the same time. The plough and other working parts are so combined as to occupy a very small space; they are strong and durable, and cheap in construction.

A A represent the two driving-wheels, B the axle, which is a strong beam elevated considerably above the line of axis of the wheels on uprights $a\, a$, at each end, next the hub of the wheels. C is the draught-pole, under which is hung the evener $b$. D is a driver's seat in the rear. E is a cross-piece, connected by side-pieces S S with the axle B, for supporting the cultivator ploughs $c\, c$, which are arranged in pairs on each side, to straddle the row of corn. The forward plough on each side runs near the corn, to throw the earth up to the plants, and the rear plough of each pair runs further out, to destroy the grass and weeds between the rows of corn. The plough-beams F F are suspended at the fore ends by clevises $d\, d$, which are made adjustable by their attachment to iron pendants $e\, e$, in which the clevis-bolts which secure them may be shifted up and down, to raise or lower the plough-beams. The pendants $e\, e$ are also adjustable sidewise, by shifting the bolts $f\, f$, which work in slots in the cross-beam E. G G are the plough standards, fastened to the beams F F, and secured firmly by braces $g\, g$. $h\, h$ are stirrups, made of rod iron, attached to the standards of the forward ploughs and the plough-beams at convenient points, to receive the driver's feet, by which the ploughs are controlled and guided, to bring them nearer or further from the corn, as may be required when ploughing. The plough-beams have a vibrating movement sidewise for this purpose, by reason of their connection with clevises at the fore ends. They also have an up-and-down movement for regulating the depth of the ploughs by means of the sliding uprights $i\, i$, the lower ends of which are pivoted to the plough-beams F F, and the upper ends of which pass through and are held in place by loops $k\, k$ fastened to the upper ends of posts $m\, m$ standing on the axle B. The ploughs are raised or lowered as desired, and held in place, as to the depth to which they may work, by pins $l\, l$ passing through holes in the upper part of the uprights $i\, i$, and resting on the tops of the posts $m\, m$. For raising the ploughs high enough to clear the ground, to move to and from the field, and turn at the ends of the rows, a lever, $n$, connected with a cross-bar, $n'$, is attached to the rear side of the axle B. The plough-beams F F are fastened to the lever $n$ and cross-bar $n'$ by the chains $p\, p$, and they are raised or lowered readily by the driver with the lever, which may be hung up by a catch, $q$, to one of the posts, $m$, for keeping the ploughs clear of the ground when moved about.

Having thus described my invention, I claim as new, and desire to secure by Letters Patent—

The combination of the slotted cross-piece E, side-pieces S, bolts $f$, pendants $e$, adjustable clevises $d$, and beams F, substantially as described, for the purpose specified.

H. P. KYNETT.

Witnesses:
 LEWIS DURBIN,
 THEODORE KENDERDINE.